ROUTE CIRCUIT NETWORK CONTROL APPARATUS FOR RAILWAY SIGNALS

Filed Jan. 17, 1947

2 SHEETS—SHEET 1

INVENTOR.
Earl M. Allen
BY
HIS ATTORNEY

INVENTOR.
Earl M. Allen
BY
[signature]
HIS ATTORNEY

Patented Dec. 25, 1951

2,580,150

UNITED STATES PATENT OFFICE 2,580,150

ROUTE CIRCUIT NETWORK CONTROL APPARATUS FOR RAILWAY SIGNALS

Earl M. Allen, Chicago, Ill., assignor to Westinghouse Air Brake Company, a corporation of Pennsylvania Application January 17, 1947, Serial No. 722,520

8 Claims. (Cl. 246—3)

Figure 1A:
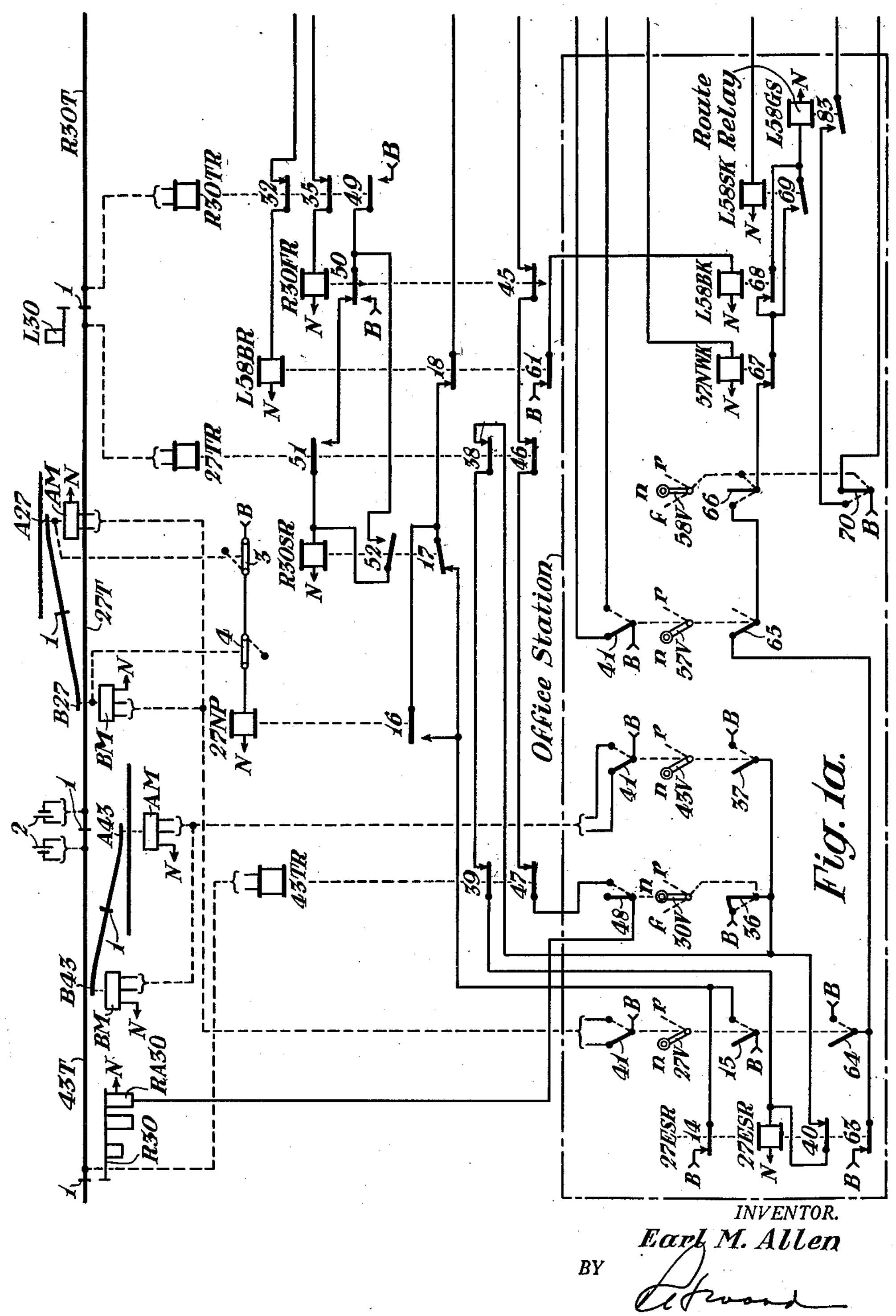

My invention relates to remote controlling apparatus, and particularly to apparatus at an office station for controlling apparatus at a field station for in turn controlling railway traffic governing devices such, for example, as switches and signals.

In apparatus of this type, it is common practice to provide a route circuit network at an office station for controlling route relays which control signal relays at a field station. The route circuit network includes contacts of switch levers and switch indication relays in addition to contacts of signal levers, according to the routes governed by the signals. Signal circuits at the field station include contacts of the signal relays and also include contacts which are closed according to the position of the switches in the routes governed by the signals. A signal relay, upon becoming energized for clearing a signal, opens the circuits for a corresponding route locking relay at the field station to prevent operation of the switches in the corresponding route, and opens the circuits for opposing signals.

Stick locking relays provided in field station apparatus are controlled in part by contacts of the signal relays. These stick locking relays are controlled by the signal relays to be energized only while contacts of the signal relays in the signal circuits at the field station are open for causing the associated signals to indicate stop.

If traffic conditions are such as to cause the signal circuit, at the field station, for any given signal to be open, the given signal will continue to indicate stop while the associated signal relay, if controlled according to prior practice, may be in condition for controlling the given signal to display a proceed indication. Therefore an associated stick locking relay might become deenergized while the associated signal cannot be cleared.

One or more track switches in a route governed by a given signal are controlled in part by a front contact of the stick locking relay which is associated with the given signal. Accordingly, the track switches cannot be operated if the stick locking relay is deenergized.

It is sometimes desirable to operate a track switch when a given signal which governs traffic movements over the switch cannot be cleared. Furthermore, in the signaling arrangement shown by applicant, an opposing signal is controlled in part by a front contact of a stick locking relay associated with the given signal. It follows that it is desirable to prevent operation of a signal relay for clearing a signal and deenergizing an associated stick locking relay if traffic conditions are such that the signal cannot be cleared although it is safe to operate a track switch in a route governed by the signal.

One feature of my invention is therefore the provision of means in the route circuit network to prevent energization of a route relay, and a corresponding signal relay, if an opposing signal has been cleared and if a train occupies the stretch of track between the opposing signal and the signal controlled by the route relay.

Another feature of my invention is the provision of means in the route circuit network for energizing a route relay to control its signal to display a call-on indication if a train has passed its signal and occupies a given portion of the stretch of track in advance of its signal.

Because of these features of applicant's invention, energization of a route relay, and in turn, the energization of a signal relay which is controlled by the route relay, are prevented under certain conditions which prevent clearing of a signal but which would permit operation of a track switch in a route governed by the signal. In previous practice, the signal circuit in the field apparatus was controlled to prevent clearing of a signal under those certain conditions but the route relay was free from such control, so that the signal relay could be energized for clearing the signal and deenergizing an associated stick locking relay. With applicant's invention, therefore, a track switch is left free to be operated for preparing a different route at times when a given signal cannot be cleared for governing traffic movements over the switch. Also, with applicant's invention, an opposing signal, in the signaling arrangement shown by applicant, cannot at times be unnecessarily caused to indicate stop.

I shall describe one form of apparatus embodying my invention, and shall then point out the novel features thereof in claims.

Figure 1B:
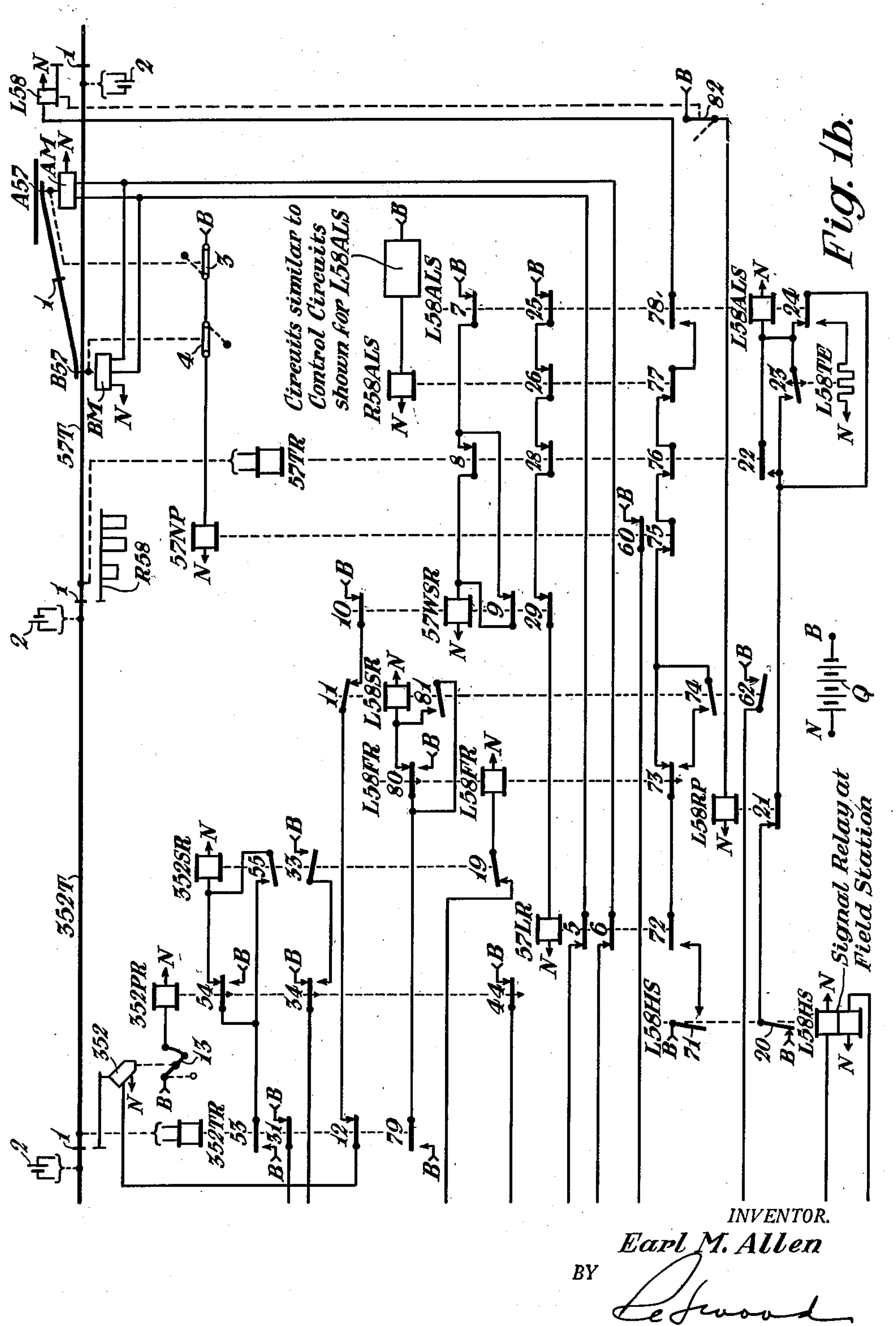

In the accompanying drawings, Figs. 1*a* and 1*b*, when placed end to end, with Fig. 1*a* on the left, constitute a diagrammatic view showing one form of apparatus embodying my invention, in which a stretch of track is provided with switches and signals including a signal at each end of the stretch for governing traffic movements in opposite directions into the stretch, together with apparatus at field stations for controlling the switches and signals and for controlling repeater or indication relays at the office station; and Fig. 1*a* shows the indication relays at the office station, together with apparatus for controlling apparatus at the field stations.

In the form of apparatus shown in the accompanying drawings, the apparatus at the office station is shown controlling the field station apparatus by direct wire circuits, but may control apparatus at the field station by time code apparatus such as shown and described in Letters Patent of the United States No. 2,273,383 granted February 17, 1942, to C. S. Snavely and A. B. Miller for Remote Control Systems.

Similar reference characters refer to similar parts in each of the views.

Referring further to the drawings, a track layout is shown, in which a given track is equipped with signals and is connected with other tracks by crossovers including switches designated by the reference characters A27, B27, A43, B43, A57 and B57. In order to simplify the drawing, each track, comprising two parallel series of track rails, is represented by a single line.

The track which is equipped with signals is divided by insulated joints I to form switch sections designated by the reference characters 27T, 43T and 57T in which switches B27, B43 and B57, respectively, are located, and block sections, designated by the reference characters 352T and R30T. Each of these track sections is provided with a track circuit including a suitable source of current such as a battery 2, connected across the rails adjacent one end of the section, and a track relay, designated by a reference character which is the same as the reference character for its section except that it includes also the letter R, connected across the rails adjacent the opposite end of the section. As is obvious and well-known, such track relays are traffic responsive relays, being responsive to railway traffic movements over the corresponding track sections.

Traffic movements toward the right, as shown in the drawings, which I shall assume is the eastbound direction, are governed by a group of signals R58 mounted on a common mast, by a signal 352, and by a group of signals R30 including a signal RA30. Traffic movements in the opposite, or westbound direction, are governed by signals L58 and L30. The signals may be of any suitable design such, for example, as the semaphore or the searchlight type.

Switches A57 and B57 are operable to their normal positions, in which they are shown in the drawing, or to the opposite or reverse positions, by mechanisms designated by the reference characters AM and BM, respectively. Mechanisms AM and BM are in turn controlled by field equipment at a field station through contacts of a switch locking relay 57LR in response to manipulation of a switch control lever 57V at the control station. Operation of switches A27 and B27 may be controlled by a lever 27V, and operation of switches A43 and B43 may be similarly controlled by a lever 43V, as shown in Fig. 1*a* of the drawings.

A switch repeater relay 57NP is controlled in conjunction with switches A57 and B57 to be energized when both of these switches are in the normal position. Relay 27NP is similarly controlled in conjunction with switches A27 and B27.

Signal L58 is controlled to display a clear or proceed indication by a circuit which includes a reverse polar contact 71 of a polar stick signal relay L58HS and a front contact 75 of switch repeater relay 57NP. Relay L58HS is controlled by equipment at the office station through energization of a route relay L58GS. The circuit for controlling signal L58 also includes contacts of a slow releasing traffic relay L58FR and a directional stick relay L58SR. Relay L58SR becomes energized when a westbound train enters section 352T.

A normally energized stick locking relay L58ALS becomes deenergized when relay L58HS becomes energized in the reverse direction for clearing signal L58.

A second normally energized stick locking relay R58ALS is controlled, in conjunction with signals R58, similarly to the manner in which relay L58ALS is controlled in conjunction with signal L58.

A route locking relay 57WSR becomes deenergized in response to deenergization of relay L58ALS.

Switch locking relay 57LR also becomes deenergized in response to the deenergization of relay L58ALS, and remains deenergized while a train is in section 57T, or while relay 57MSR is deenergized.

Operation of signal 352 to display a caution indication is controlled by relays 57WSR and L58SR and also by track relay 352TR. Only the caution control circuit is shown for signal 352, but this signal could also be controlled to display a proceed indication by a circuit controlled by these relays, if signal R58 is controlled to display a proceed indication.

A block indication relay L58BR is controlled by contacts of relays 352TR and R30TR.

Relays 57NP, L58BR and L58SR control indication relays 57NWK, L58BK and L58SK, respectively, at the office station.

Block indication relay L58BR, on account of being controlled by traffic responsive track relays, is obviously also a traffic responsive relay, and indication relay L58BK, on account of being controlled by relay L58BR, is also obviously a traffic responsive relay.

A second directional stick relay 352SR is arranged to become energized when a train passes signal 352 into section 352T while signal 352 is displaying a caution or a proceed indication.

A slow releasing signal repeater relay 352PR is controlled in conjunction with signal 352 to be energized if signal 352 is indicating caution or proceed.

A stop indication repeater relay L58RP is controlled in conjunction with signal L58 to be energized if and only if signal L58 is indicating stop.

Operation of signal RA30 to display a proceed indication is controlled by relay 352PR and by a second traffic relay R30FR, which is slow releasing, and also by a signal lever 30V at the office station.

A third directional stick relay R30SR is arranged to become energized when an eastbound train enters section R30 while relay R30FR is energized.

Referring to Fig. 1*a*, control apparatus is shown in an office or control station which may, for example, be a dispatcher's office, for manually controlling switches A57 and B57 and signal L58. Indication relays 57NWK, L58BK and L58SK are shown which are controlled by relays 57NP, L58BR and L58SR, respectively. A normally energized route locking relay 27ESR is also shown which is associated with signals R30 and which is arranged to become deenergized when signal RA30 is manually controlled to display a proceed indication while lever 43V is in its *n* position, and which then remains deenergized while a train occupies section 27T or 43T.

Manually operable levers, designated by the reference characters 30V and 58V, are shown for controlling signals 30 and 58, respectively. Each of these levers has a normal or *n* position, in which the lever is shown in the drawing, and also has reverse positions *f* and *r*. Manually operable levers 27V, 43V and 57V are also shown for controlling operation of switches 27, 43 and 57, respectively. Each of these levers has a normal position *n*, in which it is shown in the drawing, and a reverse position *r*.

A route relay L58GS is shown controlled by circuits which may be part of a route control circuit network.

Having described, in general, the arrangement and control of the apparatus shown by the accompanying drawings, I shall now describe, in detail, its operation.

As shown by the drawings, all parts are in their normal condition, that is, all switches are in their normal position; all signals except signal 352 are indicating stop, and signal 352 is indicating caution; all track sections are unoccupied, and hence the track relays are energized; each of the levers shown in Fig. 1*a* is in its *n* position; contacts of relay L58HS are in their normal position; relays 57NP, 57WSR, L58FR, L58ALS, R58ALS, L58RP, 57LR, 352PR, L58BR, 27NP, R30FR, 57NWK, L58BK and 27ESR are energized; and relays L58SR, 352SR, R30SR, L58SK and L58GS are deenergized.

The circuit by which relay 57NP is energized passes from terminal B of a suitable source of current, such for example as a battery Q shown in Fig. 1*b* of the drawings, through contact 3 closed when switch A57 is in the normal position, contact 4 closed when switch B57 is in its normal position, and the winding of relay 57NP to terminal N of the same source of current.

Relay 57WSR is energized by both a pick-up and a stick circuit, the pick-up circuit passing from terminal B, through contacts 7 and 8 of relays L58ALS and 57TR, respectively, and the winding of relay 57WSR to terminal N. The stick circuit is the same as the pick-up circuit just traced for this relay except that it includes contact 9 of relay 57WSR instead of contact 8 of relay 57TR.

Signal 352 is controlled to display the caution indication by a circuit passing from terminal B, through contact 10 of relay 57WSR, contact 11 of relay L58SR, contact 12 of relay 352TR, and the mechanism of signal 352 to terminal N. Relay 352PR is energized by an obvious circuit which includes a contact 13 closed by signal 352 while this signal is indicating caution or proceed.

Relay L58FR is energized by a circuit passing from terminal B, through contacts 14, 17, 18 and 19 of relays 27ESR, R30SR, L58BR, and 352SR, respectively, and the winding of relay L58FR to terminal N.

Relay L58RP is energized by an obvious circuit which includes a contact 82 closed in conjunction with signal L58 while this signal is indicating stop.

Relay L58ALS is energized by a stick circuit passing from terminal B, through contact 20 of relay L58HS closed in the normal or left-hand position, contact 21 of relay L58RP, the front point of contact 24 of relay L58ALS, and the winding of relay L58ALS to terminal N.

Relay 57LR is energized by a circuit which includes contact 25 of relay L58ALS, contacts 26, 28, and 29 of relays R58ALS, 57TR, and 57WSR, respectively, and the winding of relay 57LR to terminal N.

Relay L58BR is energized by a circuit passing from terminal B, through contact 31 of relay 352TR, contact 32 of relay R30TR, and the winding of relay L58BR to terminal N.

Relay R30FR is energized by a circuit passing from terminal B, through the front point of contact 34 of relay 352PR, contact 35 of relay R30TR, and the winding of relay R30FR to terminal N.

Both a pick-up and a stick circuit are closed for energizing relay 27ESR shown in Fig. 1*a*. The pick-up circuit passes from terminal B, through contact 36 of lever 30V closed in the *n* or the *f* position or at any point between the *n* and the *f* positions, contacts 38 and 39 of relays 27TR and 43TR, respectively, and the winding of relay 27ESR to terminal N. The stick circuit is the same as the pick-up circuit just traced except that it includes contact 40 of relay 27ESR instead of contacts 38 and 39 of relays 27TR and 43TR.

I shall assume that a leverman or dispatcher moves lever 30V to its *r* position for controlling signal RA30 to display a proceed indication. Lever 30V, upon being moved to its *r* position, opens its contact 36, thereby deenergizing relay 27ESR. With lever 30V in its *r* position, the arm of signal RA30 is operated to display the proceed indication by a circuit passing from terminal B, through contacts 44, 45, 46, and 47 of relays 352PR, R30FR, 27TR, and 43TR, respectively, contact 48 of lever 30V, and the mechanism of signal RA30 to terminal N.

When an eastbound train passes signal RA30 and enters section 43T, deenergizing relay 43TR, contact 47 of relay 43TR opens the circuit traced for signal RA30, causing this signal to again display the stop indication. If, now, the dispatcher returns lever 30V to its *n* position, closing contact 36 of lever 30V, relay 27ESR will still not become energized because its pick-up circuit is open at contact 39 of relay 43TR. Since the pick-up circuit for relay 27ESR also includes contact 38 of relay 27TR, relay 27ESR will remain deenergized as long as the train occupies either section 27T or 43T.

I shall assume also, that while relay 27ESR is deenergized either because lever 30V is in its *r* position or because a train is in section 27T or 43T, the dispatcher attempts to clear signal L58 for a westbound train by moving lever 58V to its *f* position. On account of relay 27ESR being deenergized, its contact 63 is now open in the circuits for relay L58GS, so that although contact 66 of lever 58V becomes closed when lever 58V is moved to the *f* position, relay L58GS cannot become energized. With relay L58GS deenergized, relay L58HS cannot become energized in the reverse direction although lever 58V is moved to the *f* position, since contact 83 of relay L58GS is now open. The contacts of relay L58HS will therefore remain in the normal position, and hence signal L58 canot be cleared.

If the circuits for relay L58GS did not include contact 63 of relay 27ESR, so that relay L58GS could now become energized, relay L58HS would become energized in the reverse direction by a circuit controlled by contact 70 of lever 58V closed in the *f* position, and contact 83 of relay L58GS. Relay L58HS, upon thus becoming energized in the reverse direction, would open its contact 20 in the stick circuit previously traced for relay L58ALS, causing this relay to become deenergized. Relay L58ALS, upon becoming deenergized, would open its contact 7 in the circuit previously traced for relay 57WSR, causing relay 57WSR to become deenergized. With relay 57WRS deenergized, its contact 10 would open the circuit previously traced for signal 352, causing signal 352 to display a stop indication while a train is approaching signal 352 after having passed signal RA30.

When a train enters section R30T, contact 32 of relay R30TR opens the circuit previously traced for relay L58BR, and hence contact 61 of relay L58BR opens the control circuit for relay L58BK, causing relay L58BK to become deenergized.

Deenergization of relay R30TR closes a pick-up circuit for relay R30SR, passing from terminal B, through contact 49 of relay R30TR, front point of contact 50 of relay R30FR, contact 51 of relay 27TR, and the winding of relay R30SR to terminal N. Although contact 35 of relay R30TR opens the circuit previously traced for relay R30FR, causing relay R30FR to become deenergized, this relay is of the slow releasing type, and hence its contact 50 remains closed at the front point long enough for relay R30SR to become energized. When contact 50 of relay R30FR becomes closed at its back point, a stick circuit is closed for relay R30SR, passing from terminal B, through the back point of contact 50 of relay R30FR, contact 52 of relay R30SR, and the winding of relay R30SR to terminal N.

With relay R30SR energized, its contact 17 in the circuit previously traced for relay L58FR now becomes opened in addition to contact 14 of relay 27ESR.

With relay L58BK deenergized, contact 68 of this relay will be open in the circuit for relay L58GS in addition to contact 63 of relay 27ESR, and hence relay L58GS will remain deenergized as long as the eastbound train causes relay L58BK to remain deenergized. In this way, the dispatcher is prevented from effecting energization of relay L58HS in the reverse position which would cause signal 352 to change to the stop indication while an eastbound train is approaching this signal.

When an eastbound train passes signal 352, causing relay 352TR to become deenergized, contact 12 of relay 352TR opens the circuit previously traced for signal 352, causing this signal to display the stop indication. Contact 13 of signal 352 will thereupon open the circuit for relay 352PR, causing this relay to become deenergized.

Relay 352TR, upon becoming deenergized, closes a pick-up circuit for relay 352SR, this circuit passing from terminal B, through contact 53 of relay 352TR, front point of contact 54 of relay 352PR, and the winding of relay 352SR to terminal N. Relay 352SR, upon becoming energized, completes a stick circuit passing from terminal B, through contact 53 of relay 352TR, contact 55 of relay 352SR, and the winding of relay 352SR to terminal N.

When relay 352PR becomes deenergized, a second stick circuit is completed for relay 352SR, this circuit passing from terminal B, through the back point of contact 54 of relay 352PR, contact 55 of relay 352SR, and the winding of relay 352SR to terminal N. With relay 352SR energized, contact 19 of this relay will be open in the circuit traced for relay L58FR.

When the train leaves section R30T, relay R30FR will become energized by a circuit passing from terminal B, through contact 33 of relay 352SR, back point of contact 34 of relay 352PR, contact 35 of relay R30TR, and the winding of relay R30FR to terminal N. When relay R30TR becomes energized, its contact 49 will open the first stick circuit previously traced for relay R30SR, and when relay R30FR becomes energized, the second stick circuit for relay R30SR will become opened at the back point of contact 50 of relay R30FR, causing relay R30SR to again become deenergized.

When the eastbound train has passed through sections 352T and 57T, all parts of the apparatus will again be in the normal condition.

I shall now assume that, with all parts of the apparatus again in the normal condition, the dispatcher decides to clear signal L58 for a westbound train. He will, therefore, move lever 58V to its *f* position. Relay L58GS will then become energized by a circuit passing from terminal B, through contact 63 of relay 27ESR, contact 65 of lever 57V, contact 66 of lever 58V closed in the *f* position, contacts 67 and 68 of relays 57NWK and L58BK, respectively, and the winding of relay L58GS to terminal N. With lever 58V in its *f* position, its contact 70 will be closed in a circuit which includes contact 83 of relay L58GS for effecting energization of relay L58HS in the reverse direction.

Relay L58HS, upon thus becoming energized in the reverse direction, opens its contact 20 in the circuit previously traced for relay L58ALS, causing this relay to become deenergized. Relay L58ALS, upon becoming deenergized, opens its contact 25 in the circuit previously described for relay 57LR, causing this relay to become deenergized and open its contacts 5 and 6 in the circuits for operating mechanisms AM and BM for switches A57 and B57, respectively. Relay L58ALS, upon becoming deenergized, also opens its contact 7 in the circuits previously traced for relay 57WSR, causing this relay to also become deenergized. Contact 29 of relay 57WSR will now also be opened in the circuit previously traced for relay 57LR. Relay 57WSR, upon becoming deenergized, will open its contact 10 in the circuit previously traced for signal 352, causing this signal to display the stop indication.

With relay L58HS now energized in the reverse direction, and with relays L58ALS and 57LR deenergized, a circuit is completed for controlling signal L58 to display a proceed indication, this circuit passing from terminal B, through contacts 71 and 72 of relays L58HS and 57LR, respectively, front point of contact 73 of relay L58FR, contacts 75, 76, 77 and 78 of relays 57NP, 57TR, R58ALS and L58ALS, respectively, and the mechanism of signal L58 to terminal N.

If now the dispatcher decides to control signal L58 to again display the stop indication before the arrival of a westbound train, he will return lever 58V to its *n* position, causing relay L58HS to again become energized by its normal control circuit which includes contact 70 of lever 58V in the *n* position. Contact 71 of relay L58HS will therefore open the circuit previously traced for signal L58, causing signal L58 to indicate stop. With signal L58 again indicating stop, relay L58RP will again become energized by its circuit previously described. A circuit is thus completed for energizing a time element device L58TE which may be of any suitable design, such for example as the well-known thermal type. This circuit for energizing device L58TE passes from terminal B, through contacts 20 and 21 of relays L58HS and L58RP, respectively, back point of contact 24 of relay L58ALS, and time element device L58TE, to terminal N. Upon the lapse of a measured period of time, device L58TE will close its contact 23, thereby completing a pickup circuit for energizing relay L58ALS. This pickup circuit passes from terminal B, through contacts 20 and 21 of relays L58HS and L58RP, respectively, contact 23 of device L58TE, and the winding of relay L58ALS, to terminal N. Relay L58ALS, upon thus becoming energized, opens its contact 24 at the back point, thereby deenergizing device L58TE, and closes this contact 24 at the front point, thereby again completing the stick circuit previously traced for relay L58ALS.

If the dispatcher now again clears signal L58, then when a westbound train enters section 57T, contact 76 of relay 57TR will open the circuit traced for signal L58, causing this signal to return to the stop indication. Contact 28 of relay 57TR will also be open in the circuit traced for relay 57LR. If the dispatcher now returns lever 58V to its $n$ position so that relay L58HS again becomes energized in the normal direction, relay L58ALS will become energized by a second pick-up circuit passing from terminal B, through contact 20 of relay L58HS, contacts 21 and 22 of relays L58RP and 57TR, respectively, and the winding of relay L58ALS to terminal N.

When the westbound train enters section 352T, relay L58SR will become energized by a pick-up circuit passing from terminal B, through contact 79 of relay 352TR, front point of contact 80 of relay L58FR, and the winding of relay L58SR to terminal N. Relay L58SR, upon becoming energized, completes its stick circuit passing from terminal B, through contact 79 of relay 352TR, contact 81 of relay L58SR, and the winding of relay L58SR to terminal N. Relay L58BR will become deenergized on account of contact 31 of relay 352TR becoming opened. Relay L58BR will then open its contact 18, causing relay L58FR to become deenergized and complete a second stick circuit for relay L58SR passing from terminal B, through the back point of contact 80 of relay L58FR, contact 81 of relay L58SR, and the winding of relay L58SR to terminal N. Relay L58SR, upon becoming energized, completes a circuit including its contact 62 for effecting energization of relay L58SK.

When the train leaves section 57T, the dispatcher can then clear signal 58 for a call-on traffic movement by effecting energization of relay L58GS by a circuit which is the same as the circuit previously traced for relay L58GS except that it includes contact 69 of relay L58SK instead of contact 68 of relay L58BK. Relay L58GS, upon becoming energized, effects energization of relay L58HS in the reverse direction, so that a second circuit for clearing signal L58 is now completed which is the same as the circuit previously traced for signal L58 except that it includes a back point of contact 73 of relay L58FR and contact 74 of relay L58SR instead of the front point of contact 73 of relay L58FR.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a stretch of railway track, a first and a second signal located at opposite ends of said stretch for governing traffic movements into said stretch in opposite directions, a normally energized route locking relay associated with said first signal, manually controllable means for controlling said first signal and for deenergizing said route locking relay when said first signal is manually controlled to display a proceed indication, traffic responsive means for then retaining said route locking relay deenergized while a train occupies a portion of said stretch of track in advance of said first signal, a traffic responsive relay, normally energized means for energizing said traffic responsive relay but becoming deenergized when a train occupies a second portion of said stretch of track, a directional stick relay, a pick-up circuit for energizing said stick relay when a train moving in the direction in which it is governed by said second signal enters said second portion of said stretch, a stick circuit for then retaining said stick relay energized while said train occupies said second portion of said stretch, and a control circuit for said second signal controlled by a front contact of said route locking relay and also controlled by a front contact of said traffic responsive relay in multiple with means controlled by a front contact of said directional stick relay.

2. In combination, a stretch of railway track, a first and a second signal located at opposite ends of said stretch for governing traffic movements into said stretch in opposite directions, a normally energized route locking relay associated with said first signal, manually controllable means for controlling said first signal and for deenergizing said route locking relay when said first signal is manually controlled to display a proceed indication, traffic responsive means for then retaining said route locking relay deenergized while a train occupies a portion of said stretch of track in advance of said first signal, a traffic responsive relay, normally energized means for energizing said traffic responsive relay but becoming deenergized when a train occupies a second portion of said stretch of track, a directional relay, means for energizing said directional relay when a train moving in the direction in which it is governed by said second signal enters said second portion of said stretch, means for then retaining said directional relay energized while said train occupies said second portion of said stretch, and a control circuit for said second signal controlled by a front contact of said route locking relay and controlled by a front contact of said traffic responsive relay in multiple with means controlled by a front contact of said directional relay and also controlled by manually controllable means for clearing said second signal and preventing clearing of said first signal.

3. In combination, a stretch of railway track, a first and a second signal located at opposite ends of said stretch for governing traffic movements into said stretch in opposite directions, a normally energized route locking relay associated with said first signal, manually controllable means for controlling said first signal and for deenergizing said route locking relay when said first signal is manually controlled to display a proceed indication, traffic responsive means for then retaining said route locking relay deenergized while a train occupies a portion of said stretch of track in advance of said first signal, a traffic responsive relay, normally energized means for energizing said traffic responsive relay but becoming deenergized when a train occupies a second portion of said stretch of track, a directional relay, means for energizing said directional relay when a train moving in the direction in which it is governed by said second signal enters said second portion of said stretch, means for then retaining said directional relay energized while said train occupies said second portion of said stretch, manually controllable means controlled also by said route locking relay and by said traffic responsive relay for clearing said second signal if said first signal is indicating stop and if said stretch of track is unoccupied, and manually controllable means controlled also by said directional relay for clearing said second signal for a call-on traffic movement if said stretch of track is occupied by a train moving from said second signal toward said first signal.

4. In a remote control system comprising an office station and a field station for controlling a plurality of railway traffic governing devices including a first and a second signal at opposite ends of a given stretch of track for governing traffic movements into said stretch in opposite directions, the combination comprising, a normally energized route locking relay associated with said first signal, manually controllable means for deenergizing said route locking relay when said first signal is controlled to display a proceed indication, train controlled means for then retaining said route locking relay deenergized while a train occupies a portion of said stretch, a portion of a route network at said office station including a control circuit for said second signal controlled by a front contact of said route locking relay and by a manually operable device, a locking relay at said field station, a polar stick relay controlled by said control circuit at said office station for clearing said second signal and deenergizing said locking relay at said field station, and control means for said first signal including a front contact of said locking relay at said field station.

5. In a remote control system comprising an office station and a field station for controlling a plurality of railway traffic governing devices including a first and a second signal at opposite ends of a given stretch of track for governing traffic movements into said stretch in opposite directions, the combination comprising, a manually operable device for controlling said first signal, a normally closed contact controlled by said manually operable device which becomes opened if said first signal is controlled by said manually operable device to display a proceed indication, traffic responsive means, a second normally closed contact controlled by said traffic responsive means which becomes opened if a train occupies a portion of said stretch, a control circuit at said office station for said second signal controlled by said first and second contacts and by a second manually operable device, a locking relay at said field station, means controlled by said control circuit at said office station for clearing said second signal and deenergizing said locking relay, and control means for said first signal including a front contact of said locking relay.

6. In a remote control system comprising an office station and a field station for controlling a plurality of railway traffic governing devices including a first and a second signal at opposite ends of a given stretch of track for governing traffic movements into said stretch in opposite directions, the combination comprising, a manually operable device for controlling said first signal, a normally closed contact controlled by said manually operable device which becomes opened if said first signal is controlled by said manually operable device to display a proceed indication, traffic responsive means, a second normally closed contact controlled by said traffic responsive means which becomes opened if a train occupies a portion of said stretch, other traffic responsive means, a third contact normally open controlled by said other traffic responsive means which becomes closed if a train passes said second signal into said stretch, a control circuit at said office station including said first contact and including said second contact in multiple with said third contact and also including a manually controllable contact, a locking relay at said field station, means controlled by said control circuit at said office station for clearing said second signal and deenergizing said locking relay, and control means for said first signal including a front contact of said locking relay.

7. In a remote control system comprising an office station and a field station for controlling a plurality of railway traffic governing devices including a first and a second signal at opposite ends of a given stretch of track for governing traffic movements into said stretch in opposite directions, the combination comprising, a manually operable device for controlling said first signal, a normally closed contact controlled by said manually operable device which becomes opened if said first signal is controlled by said manually operable device to display a proceed indication, traffic responsive means, a second normally closed contact controlled by said traffic responsive means which becomes opened if a train occupies a portion of said stretch, a control circuit at said office station for said second signal controlled by said first and second contacts and by a second manually operable device, a locking relay at said field station, means controlled by said control circuit at said office station for clearing said second signal and deenergizing said locking relay, a track switch in a route governed by said second signal, and control means for said track switch including a front contact of said locking relay.

8. In a remote control system comprising an office station and a field station for controlling a plurality of railway traffic governing devices including a first and a second signal at opposite ends of a given stretch of track for governing traffic movements into said stretch in opposite directions, the combination comprising, a normally energized route locking relay associated with said first signal, manually controllable means for deenergizing said route locking relay when said first signal is controlled to display a proceed indication, train controlled means for then retaining said route locking relay deenergized while a train occupies a portion of said stretch, a route network at said office station including a control circuit for said second signal controlled by a front contact of said route locking relay and by a manually operable device, a locking relay at said field station, a polar stick relay controlled by said control circuit at said office station for clearing said second signal and deenergizing said locking relay at said field station, and control means for a track switch in a route governed by said second signal including a front contact of said locking relay.

EARL M. ALLEN.

REFERENCES CITED

The following references are of record in the file of this patent:

UNITED STATES PATENTS

| Number | Name | Date |
| --- | --- | --- |
| 2,109,153 | Phinney | Feb. 22, 1938 |
| 2,317,732 | Coley | Apr. 27, 1943 |
| 2,342,488 | Preston | Feb. 22, 1944 |